(12) United States Patent
Anderson et al.

(10) Patent No.: US 7,506,501 B2
(45) Date of Patent: Mar. 24, 2009

(54) COMPACT MIXER WITH TRIMMABLE OPEN CENTERBODY

(75) Inventors: Morris G. Anderson, Mesa, AZ (US); John C. Gerrard, Gilbert, AZ (US); Ron G. Ruiz, Scottsdale, AZ (US); Robert D. Mitchell, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 582 days.

(21) Appl. No.: 11/223,556

(22) Filed: Sep. 9, 2005

(65) Prior Publication Data

US 2006/0207239 A1    Sep. 21, 2006

Related U.S. Application Data

(63) Continuation-in-part of application No. 11/000,730, filed on Dec. 1, 2004, now Pat. No. 7,389,635.

(51) Int. Cl.
*F02K 1/34* (2006.01)
(52) U.S. Cl. .................................... 60/262; 239/265.17
(58) Field of Classification Search .................. 60/39.5, 60/226.1, 262, 264; 181/220; 239/265.17
See application file for complete search history.

(56) References Cited

U.S. PATENT DOCUMENTS

| | | | |
|---|---|---|---|
| 3,153,319 A | 10/1964 | Young et al. | |
| 3,710,890 A | 1/1973 | True et al. | |
| 3,871,174 A * | 3/1975 | Buisson et al. | 60/262 |
| 4,003,249 A | 1/1977 | Laskody | |
| 4,066,214 A | 1/1978 | Johnson | |
| 4,117,671 A | 10/1978 | Neal et al. | |
| 4,175,640 A * | 11/1979 | Birch et al. | 60/262 |
| 4,696,159 A | 9/1987 | Horgan | |
| 5,127,602 A | 7/1992 | Batey et al. | |
| 5,638,675 A | 6/1997 | Zysman et al. | |
| 5,722,233 A | 3/1998 | Nikkanen et al. | |
| 5,924,632 A | 7/1999 | Seiner et al. | |
| 6,260,352 B1 * | 7/2001 | Negulescu et al. | 60/262 |
| 6,314,721 B1 * | 11/2001 | Mathews et al. | 60/264 |
| 6,360,528 B1 * | 3/2002 | Brausch et al. | 60/262 |
| 6,532,729 B2 | 3/2003 | Martens | |
| 6,612,106 B2 | 9/2003 | Balzer | |

* cited by examiner

*Primary Examiner*—Louis J Casaregola
(74) *Attorney, Agent, or Firm*—Ingrassia Fisher & Lorenz, P.C.

(57) ABSTRACT

Compact exhaust mixer assemblies comprising a compact mixer and a trimmable open centerbody are provided. The trimmable center body allows for adjustments of the open centerbody after manufacturing and during production testing. The trimmable open centerbody may be used to compensate for production tolerances making it possible to obtain the desired core effective area for proper engine operation. The compact mixer may be either lobed or serrated. The compact exhaust mixer assemblies have a length of about half that of conventional exhaust mixer assemblies.

10 Claims, 14 Drawing Sheets

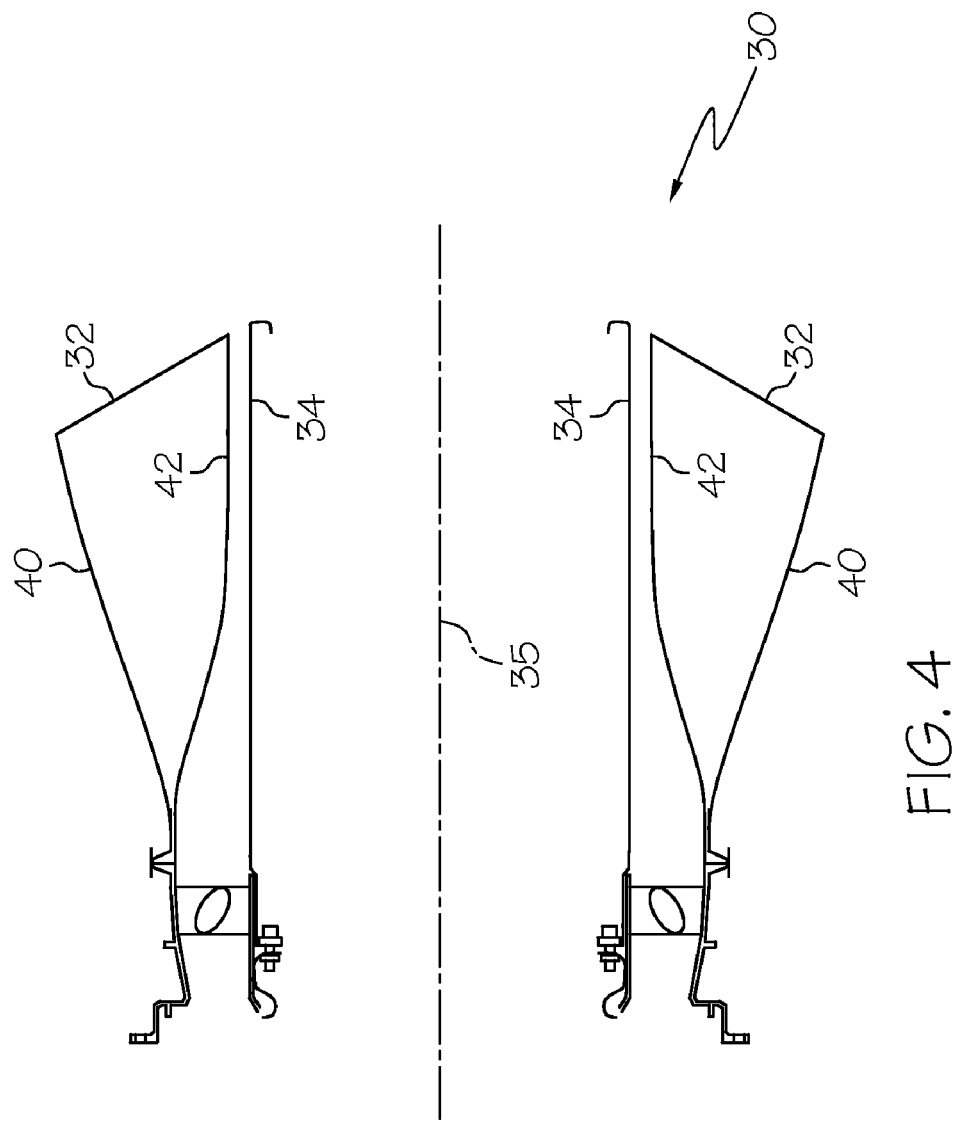

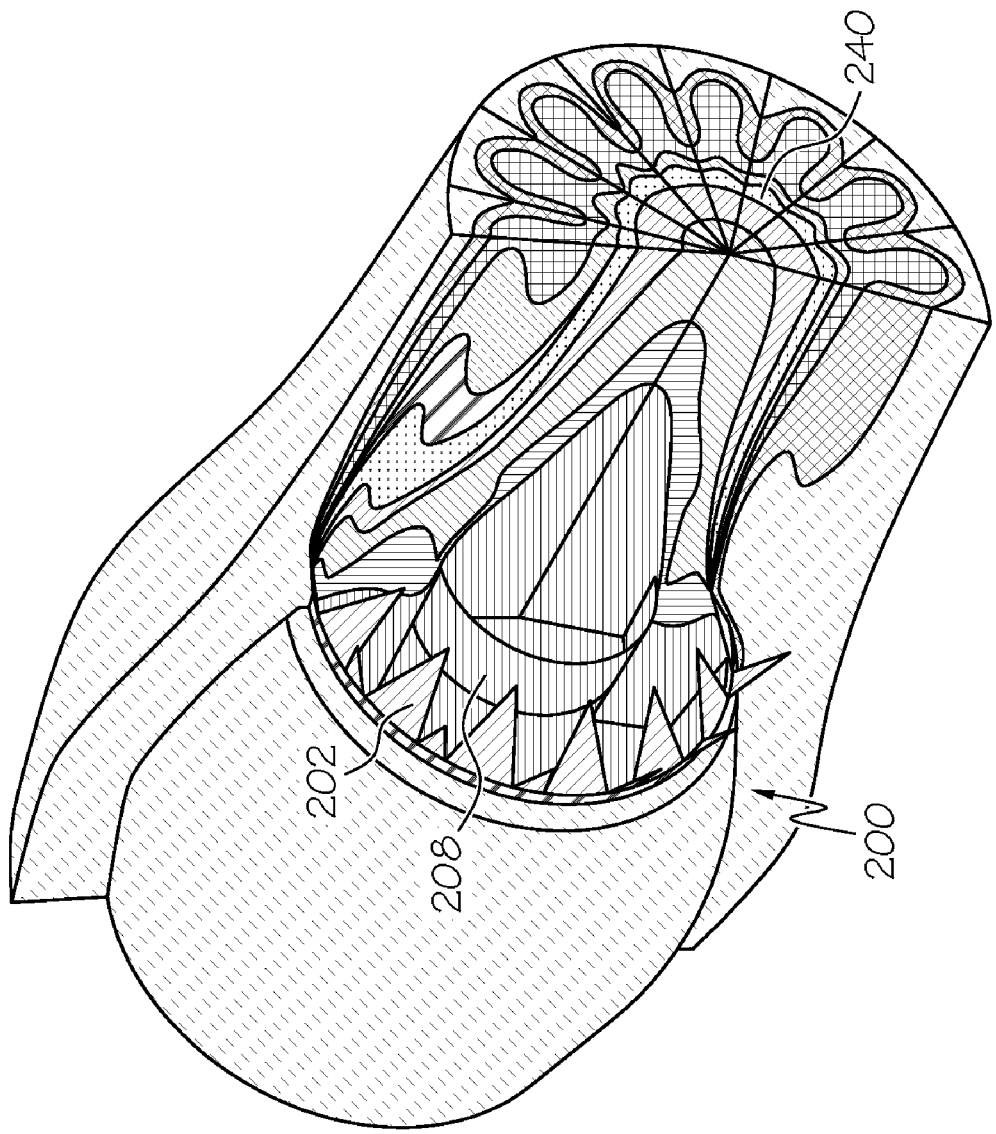
FIG. 12A
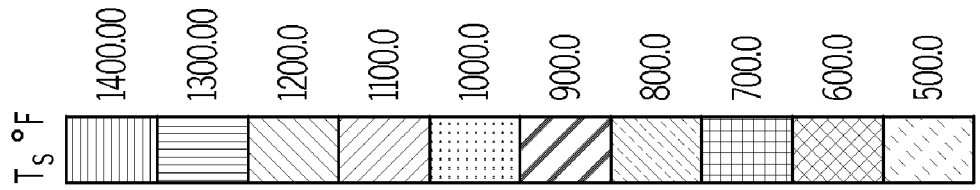

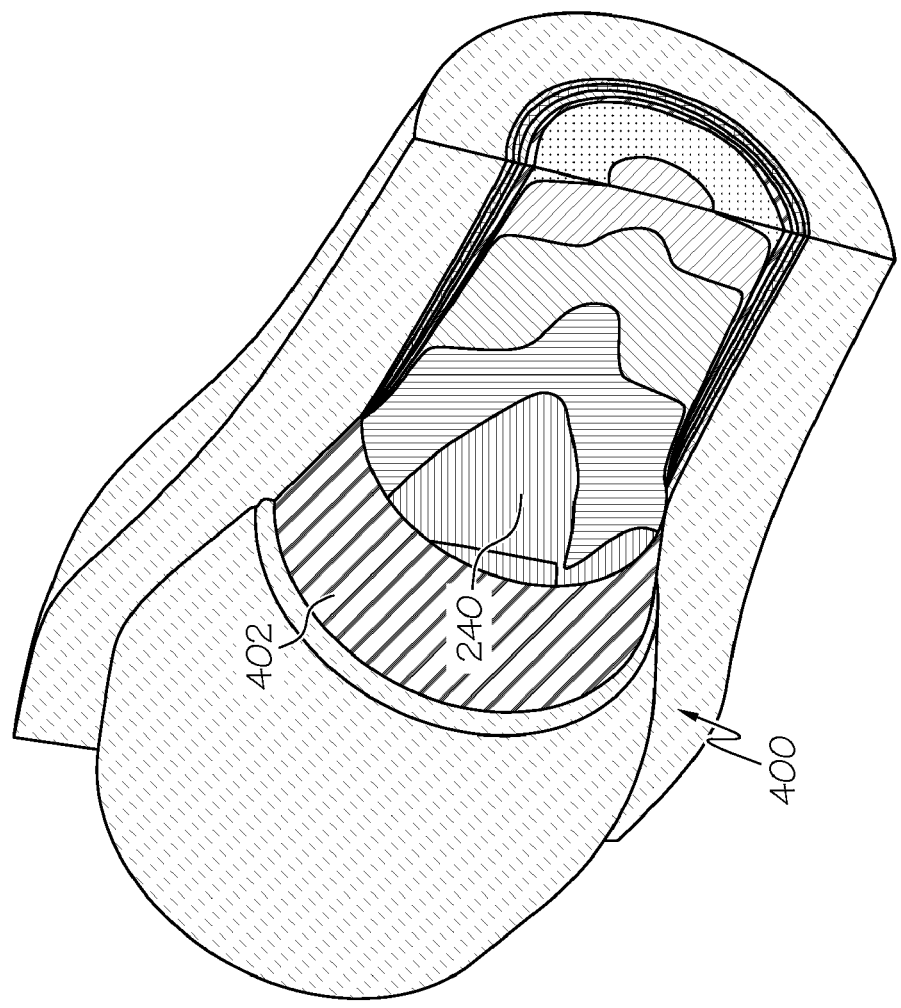
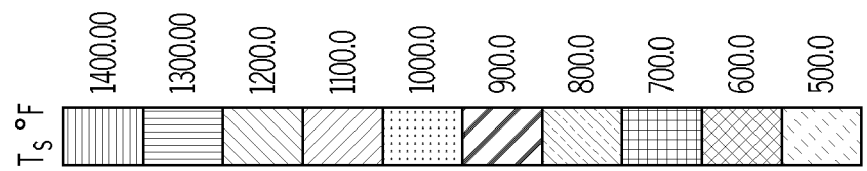
FIG. 12C

COMPACT MIXER WITH TRIMMABLE OPEN CENTERBODY

CROSS-REFERENCE TO RELATED APPLICATIONS

This application is a continuation-in-part of U.S. patent application Ser. No. 11/000,730 filed Dec. 1, 2004, now U.S. Pat. No. 7,389,635 the disclosure of which is hereby incorporated by reference.

BACKGROUND OF THE INVENTION

The present invention generally relates to exhaust mixers and, more particularly, to exhaust flow mixers for gas turbine engines that reduce the temperature and visibility of hot parts of the engine.

Exhaust can exit a turbine engine with a significant amount of swirl or rotation about the engine centerline. This swirl is usually removed with an exit guide vane to increase engine power before it is exhausted into the atmosphere. However, exit guide vanes are heavy, expensive, and may not work well at part power conditions.

The turbine exhaust can also be mixed with air from a bypass stream using a multi-lobed type of exhaust mixer. Mixing the exhaust with cooler air can reduce the noise level generated by gas turbine engines. Furthermore, in certain applications, the cooling of the exhaust air is important for blocking the visibility of the hot parts of the engine. While 100% efficiency of mixing is desirable to give a uniform temperature of the mixed exhaust and bypass stream, the mixers currently used have mixing efficiencies significantly below 100%.

There are many examples of multi-lobed mixers in the prior art. U.S. Pat. No. 4,476,002 describes a multi-lobed exhaust mixer for turbine engines having troughs and lobes, the trough and lobes having confronting pairs of flow surfaces which are twisted between their upstream and downstream ends. The multi-lobed mixer is designed to be used with a bullet centerbody. U.S. Pat. No. 6,606,854 describes a multi-lobed mixer where the lobes are shaped to block at least a portion of the hot inner surface of the mixer or hot parts of the exhaust portion of a turbine engine. The mixer of the '854 patent is also designed to be used with a bullet centerbody. While the multi-lobed mixers of the prior art show increased efficiency in the mixing of the exhaust and bypass streams to give a uniform temperature, they fall short of the goal of 100% efficiency, leaving room for further improvements.

As can be seen, there is a need for a mixer that mixes exhaust and bypass streams from a turbine engine with increased efficiency. Such an increased efficiency would result in a uniform temperature of the stream resulting from mixing engine exhaust with the bypass stream.

SUMMARY OF THE INVENTION

In one aspect of the present invention there is provided a compact exhaust mixer assembly comprising a compact mixer, the compact mixer comprising a mixer body; a compact open centerbody disposed within the compact mixer; and wherein the compact exhaust mixer assembly has a length of about half that of a conventional exhaust mixer assembly.

In another aspect of the present invention there is provided a compact exhaust mixer assembly comprising a compact lobed mixer, the compact lobed mixer comprising a mixer body and a plurality of lobes and a plurality of troughs defined between the lobes; a trimmable compact open centerbody disposed within the compact lobed mixer; and wherein the compact exhaust mixer assembly has a length of about half that of a conventional exhaust mixer assembly.

In a further aspect of the present invention there is provided a compact exhaust mixer assembly comprising a compact serrated mixer, the compact serrated mixer comprising a mixer body and a serrated edge; a trimmable compact open centerbody disposed within the compact serrated mixer; and wherein the compact exhaust mixer assembly has a length of about half that of a conventional exhaust mixer assembly.

In yet another aspect of the present invention there is provided an exhaust mixer assembly comprising: a twisted mixer comprising a plurality of lobes and a plurality of troughs defined between the lobes, wherein the lobes and troughs are twisted about a centerline axis of the twisted mixer; and a trimmable open centerbody disposed within the twisted mixer.

These and other features, aspects and advantages of the present invention will become better understood with reference to the following drawings, description and claims.

BRIEF DESCRIPTION OF THE DRAWINGS

FIG. 4 is a side sectional view of an exhaust gas mixing assembly along the IV-IV axis of FIG. 3C according to the present invention;

FIG. 12A illustrates the calculated temperature of the exhaust air as it exits the compact serrated exhaust gas mixing assembly according to the present invention;

FIG. 12C illustrates the calculated temperature of the exhaust air as it exits a compact simple exhaust gas mixing assembly according to the present invention.

DETAILED DESCRIPTION OF THE INVENTION

Figure 1:
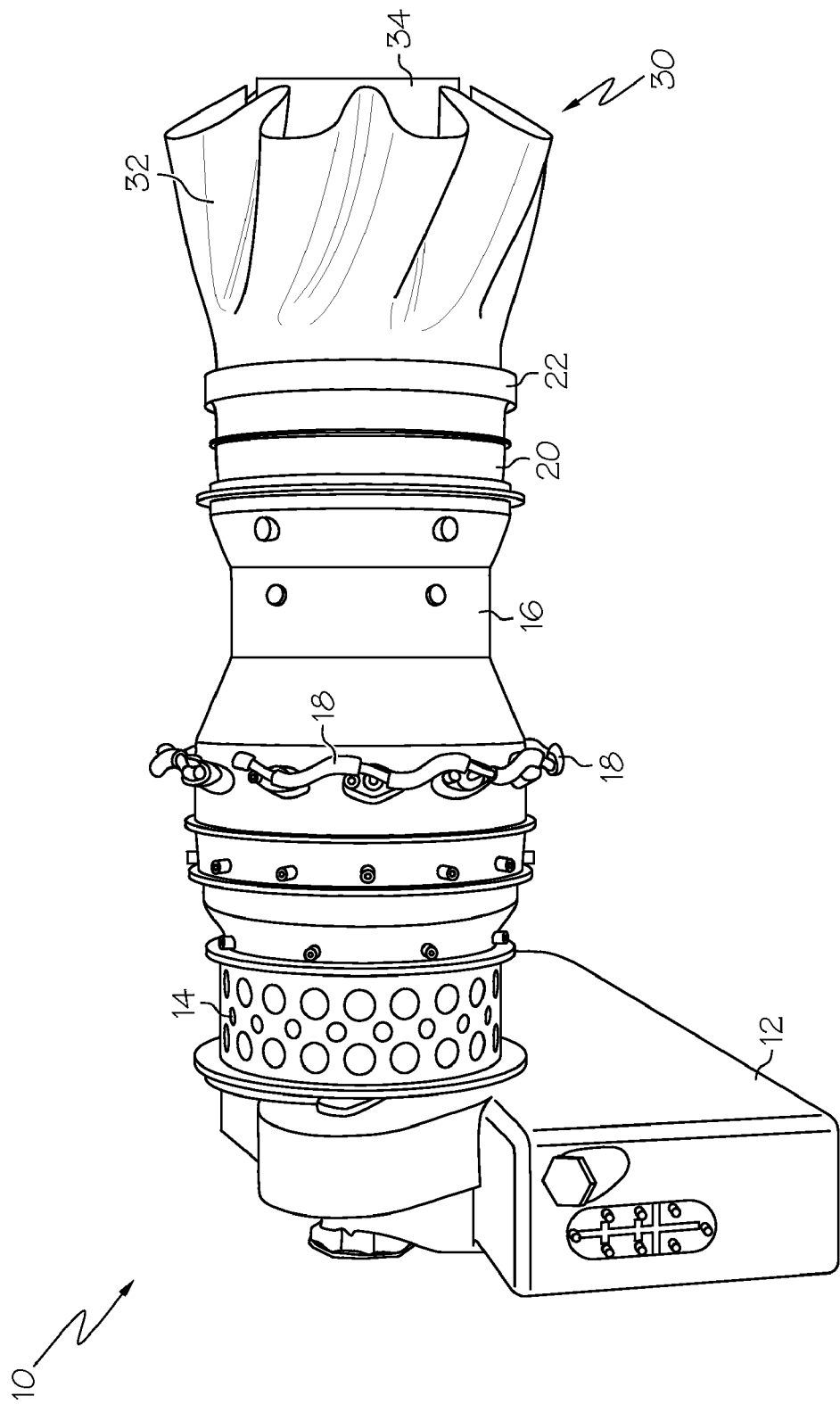
FIG. 1 is a side view of the engine of a gas turbine engine with an exhaust gas mixing assembly according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an exhaust mixer assembly and a method for cooling exhaust air from a gas turbine engine using the exhaust mixer assembly are provided. The exhaust mixer assembly may comprise a twisted mixer and an open centerbody. The twisted mixer may further comprise a plurality of lobes and a plurality of troughs defined between the lobes. The lobes and troughs may be twisted about a centerline axis of the twisted mixer. The open centerbody may be centrally disposed within the twisted mixer. The centerbody may have an aerodynamic shape, for example, a cylindrical shape. Moreover, the open centerbody may be trimmable. Also provided is a compact exhaust mixer assembly, wherein the compact mixer assembly has a length that is about half that of a conventional exhaust mixer assembly. The exhaust mixer assemblies may efficiently mix together hot exhaust air with cooler bypass air to produce an exhaust with a reduced temperature. Producing exhaust with lower temperature results in lower noise levels from the engine and can improve performance. Furthermore, particularly for military applications where stealth may be necessary, suppression of infrared heat, which normally emanates from the rear of gas turbine engines by lowering the exhaust temperature may make the engines less likely to be observed using heat-seeking observation methods. The exhaust mixer assembly of the present invention may be used with gas turbine engines, for example, but not limited to, turboshaft or turbofan gas turbine engines. Turboshaft gas turbine engines may be used in tanks, helicopters and boats while turbofan gas turbine engines may be used in aircraft.

The exhaust mixing assembly of the present invention may provide for excellent cooling of exhaust air expelled from gas turbine engines. The twisted mixer may reduce or eliminate the rotation of the exhaust air as it moves from a turbine to an exhaust nozzle in a gas turbine engine. This, in turn, may improve performance. The presence of the open centerbody may help to cool the hot exhaust air even more efficiently. The open centerbody may also allow cooler air to enter the open body, thus providing cooling for the engine aft frame. When the open centerbody is trimmable, it may allow for adjustment of a core effective area for proper matching between the engine exhaust air and bypass flow streams. Finally, the open centerbody allows for easy access to the turbo machinery upstream of the exhaust mixer assembly. In contrast to the present invention, the prior art uses a solid bullet centerbody to control flow of the exhaust air through the mixer. These solid centerbodies are not trimmable to allow for adjustment of the core effective area. This solid bullet centerbody, unlike the open centerbody of the present invention, can retain heat and decrease the efficiency of cooling the exhaust air.

Figure 2:
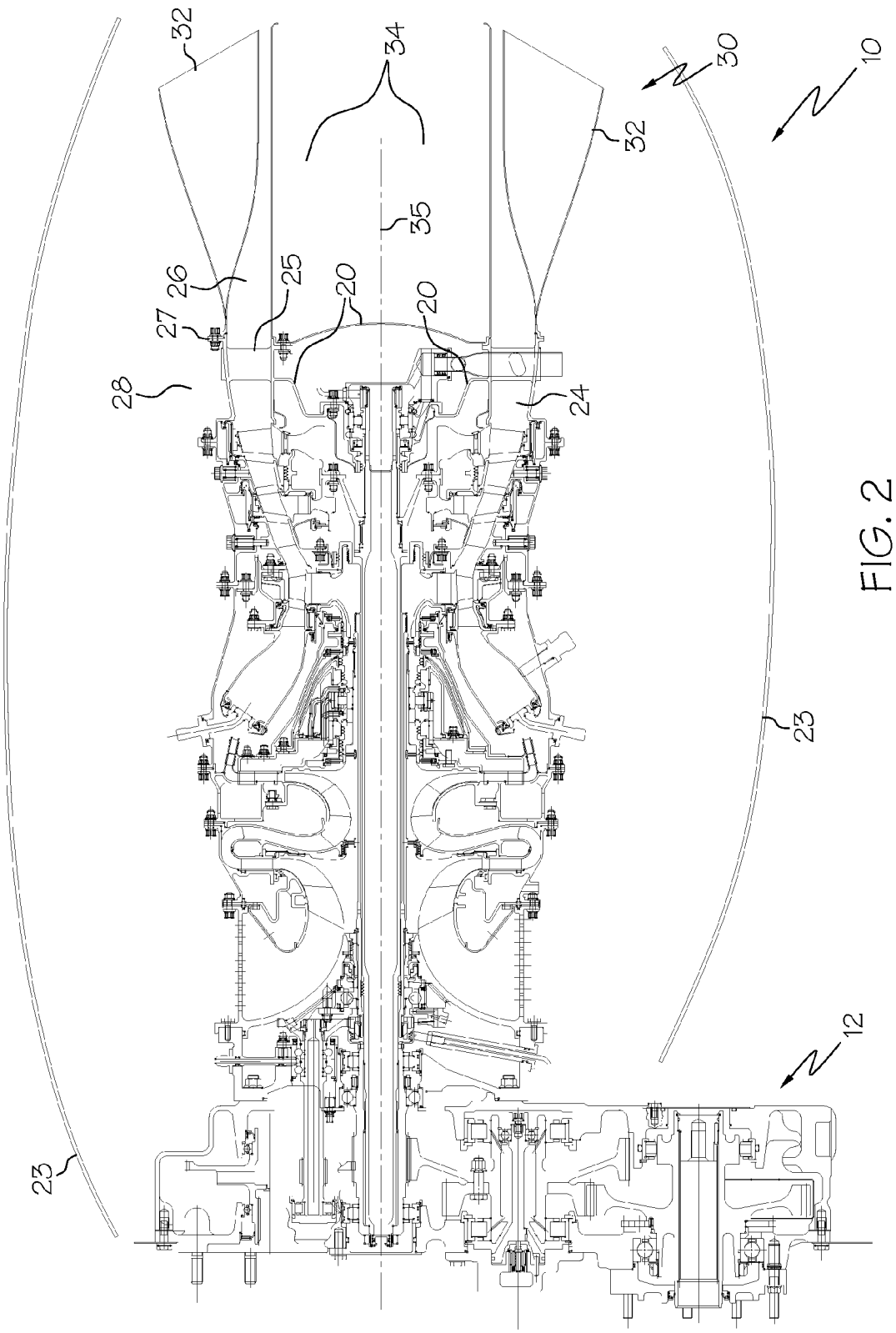
FIG. 2 is a sectional side view of the engine of FIG. 1 according to the present invention.

Illustrated in FIG. 1 is a turbine engine 10 which may comprise a gear box 12, air intake openings 14, a casing 16 covering the turbo machinery of the turbine engine 10, fuel lines 18 and a rear bearing support and aft frame 20. An exhaust mixer assembly 30 may be attached to turbine engine 10 at rear bearing support and aft frame 20. Exhaust mixer assembly 30 may further comprise a twisted mixer 32 and an open centerbody 34 wherein open centerbody 34 may be centrally disposed within twisted mixer 32. FIG. 2 is a cross-sectional view of turbine engine 10 and exhaust mixing assembly 30. The exhaust air may stream from a turbine exit 24 into an inner flow path 26. Inner flow path 26 may be defined between twisted mixer 32 and open centerbody 34. The bypass air may stream through an outer flow path 28 which may be defined between an outer engine casing 23 and twisted mixer 32.

While exhaust mixer assembly 30 may comprise twisted mixer 32 and open centerbody 34, twisted mixer 32 and open centerbody 34 may be discrete parts and may not be attached to each other. Twisted mixer 32 and open centerbody 34 may be configured to produce exhaust mixer assembly 30 by their attachment to turbine engine 10.

As illustrated in FIGS. 1 and 2, twisted mixer 32 may be attached to turbine engine rear bearing support and aft frame 20 by means known in the art. By way of non-limiting example, twisted mixer 32 may be attached to rear bearing support and aft frame 20 using a ring clamp 22 (FIG. 1). Alternatively, twisted mixer 32 may further comprise a flange 27 and twisted mixer 32 may be attached to a rear bearing support and aft frame support strut 20 by bolted flange 27 (FIG. 2). Open centerbody 34 may be attached to turbine engine 10 at rear bearing support and aft frame 20 such that open centerbody 34 may be centrally disposed within twisted mixer 32. By way of non-limiting example, open centerbody 34 may be bolted to rear bearing support as illustrated in FIG. 2.

Figure 3C:
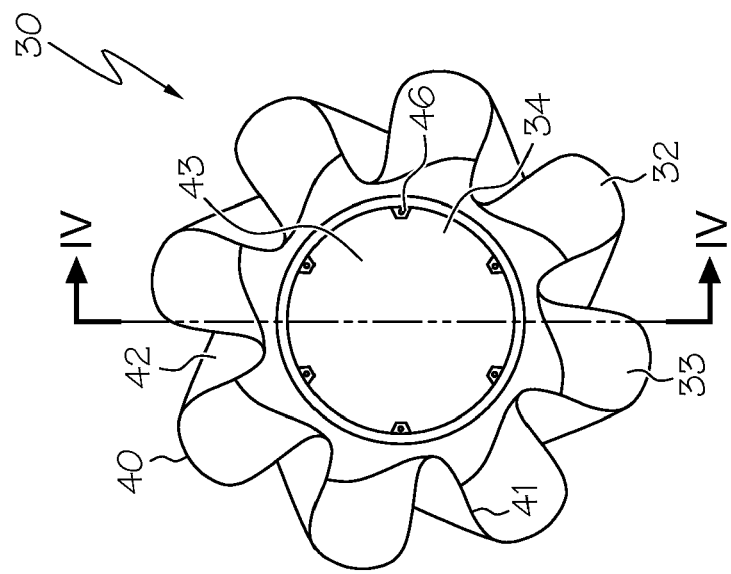
FIG. 3C is a downstream view of an exhaust gas mixing assembly according to the present invention.
Figure 3B:
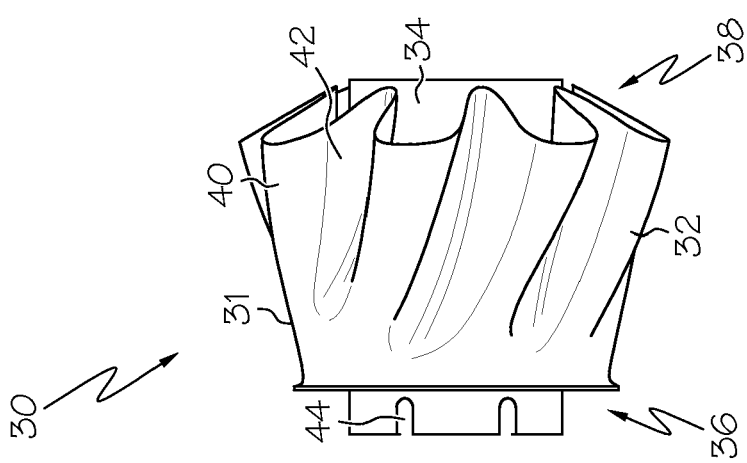
FIG. 3B is a side view of an exhaust gas mixing assembly according to the present invention.
Figure 3A:
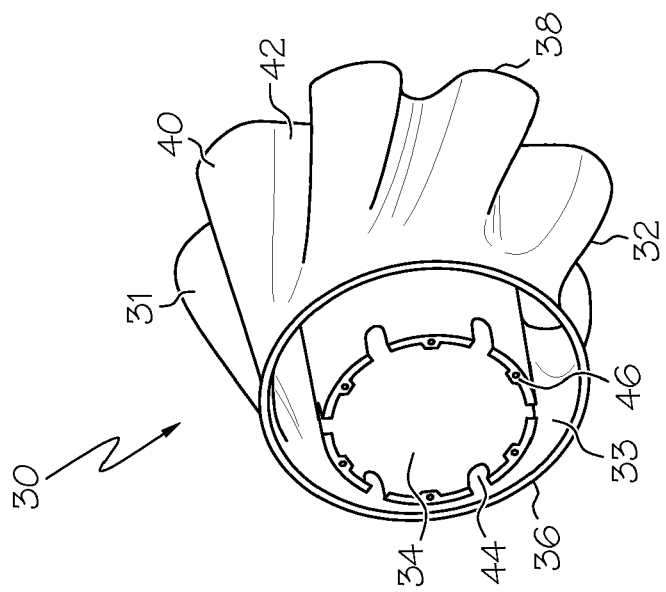
FIG. 3A is an upstream view of an exhaust gas mixing assembly according to the present invention.

Exhaust mixer assembly 30 may comprise twisted mixer 32 and open centerbody 34 where open centerbody 34 may be centrally disposed within twisted mixer 34 as shown in FIGS. 3A-3C. A cross-section of exhaust mixer assembly 30 along the IV-IV axis of FIG. 3C is shown in FIG. 4. Exhaust mixer assembly 30 may comprise an upstream end 36 and a downstream end 38 where the bypass air and exhaust air may enter exhaust mixer assembly 30 at upstream end 36 and then may be expelled from exhaust mixer assembly 30 at downstream end 38. Twisted mixer 32 may further comprise a plurality of lobes 40 and a plurality of troughs 42 defined between lobes 40. Lobes 40 and troughs 42 may be twisted about a centerline axis of the twisted mixer 32. The degree of twist may vary depending upon the amount of turbine exit swirl as well as the dimensions of the engine itself. In one illustrative example the degree of twist may be not greater than about 60° with respect to a leading edge 41 of lobe 40. In yet another illustrative example, the degree of twist may be from about 10° to about 30° with respect to leading edge 41 of lobe 40. As the bypass air streams over the outer surface 31 of the twisted mixer it may be channeled into troughs 42 on the outer surface. Conversely, as the exhaust air moves along in inner surface 33 of twisted mixer 32 it may be channeled into lobes 40. As both the bypass air and the exhaust air are passed through twisted mixer 32, both streams may gain rotational components of velocity in addition to their basic rearwards velocity. These rotational components may allow the bypass air and the exhaust air to mix effectively as they leave upstream end 38 of the exhaust mixer assembly 30 and may also increase the efficiency of the engine by increasing thrust.

Open centerbody 34 may be disposed within twisted mixer 32 as shown in FIGS. 3A-3C. Open centerbody 34, as shown in FIGS. 3A-3C, is centrally disposed with twisted mixer 32. It will be appreciated that open centerbody 34 may be disposed within twisted mixer 32 where it is not centrally aligned while still allowing for efficient mixing of exhaust air and bypass air. Open centerbody 34 may also be aerodynamic in design. As a non-limiting example, open centerbody 34 may have a cylindrical shape with smooth sides and a central opening 43. A cylindrical open centerbody 34 may have the same diameter along the entire length as shown in FIGS.

3A-3C, or it may have a smaller diameter downstream and a larger diameter upstream. Conversely, open centerbody 34 may have a larger diameter downstream and a smaller diameter upstream. As the hot exhaust air flows through inner flow path 26, open centerbody 34 may aid in channeling the exhaust air through troughs 42, increasing the efficiency of mixing the exhaust air with the bypass air. Open center body 34 may have an open or a closed upstream end. When the upstream end is open, central opening 43 may also allow cooling air to reach rear bearing support and aft frame 20 and other exposed engine parts. Cooling of rear bearing support and aft frame 20 and other exposed engine parts may suppress infrared heat emanating from the engine and thus may reduce heat visibility of the engine. In the prior art, the twisted mixer was often configured in a way to block the hot aft frame and exposed engine parts, which may have compromised efficiency of mixing. Finally, central opening 43 may allow for easy access to rear bearing support and aft frame 20 and service lines, reducing the need to disassemble exhaust mixer assembly 30 for servicing. Open centerbody 34 may further comprise bolt hole flanges 46 for bolting open centerbody 34 to rear bearing support and aft frame 20. Open centerbody 34 may also comprise service line openings 44 which may be used for running service lines through exhaust mixing assembly 30 or to allow for additional access to turbine engine 10.

While exhaust mixer assembly 30 of FIGS. 3A-3C shows twisted mixer 32 having eight lobes and troughs, it is contemplated that twisted mixer 32 may have any number of lobes or troughs, depending upon the amount of mixing and thrust desired from a gas turbine engine. The degree of twist may also be dependent on the turbine exit swirl. It will also be appreciated that the dimensions and shape of open centerbody 34 may be designed to work in concert with twisted mixer 32 to give optimal cooling and thrust. Therefore, although shown as a smooth cylinder with a length longer than that of twisted mixer 32 in FIGS. 3A-3C as an illustrative example, the actual dimensions may be determined based on the desired cooling or thrust. The shape and size of exhaust mixing assembly 30 may be determined empirically using computational fluid dynamics (CFD) codes. CFD codes are well known in the art and can either be commercially obtained or written by the skilled artisan to use to determine the dimensions twisted mixer 32 and open centerbody 34. Non-limiting examples of commercial CFD codes that may be used with the present invention are FLUENT™, CFX, or STAR-CD. Using the CFD codes the skilled artisan may determine the dimensions required to give optimal cooling and thrust in the desired application.

Open centerbody 34 may be trimmable, allowing for the adjustment of open centerbody 34 after manufacturing and during production testing. Trimmable open centerbody 34 refers to an open centerbody 34 that may be trimmed back after it has been attached to turbine engine 10. Trimming back open centerbody 34 may provide the required core effective area for proper matching between the engine exhaust stream and the bypass stream, as determined from engine test data, to compensate for variations in exhaust mixer assembly 30 associated with manufacturing processes. Trimmable open centerbody 34 may be used to compensate for production tolerances, making it possible to obtain the desired core effective area for proper engine operation.

Figure 5:
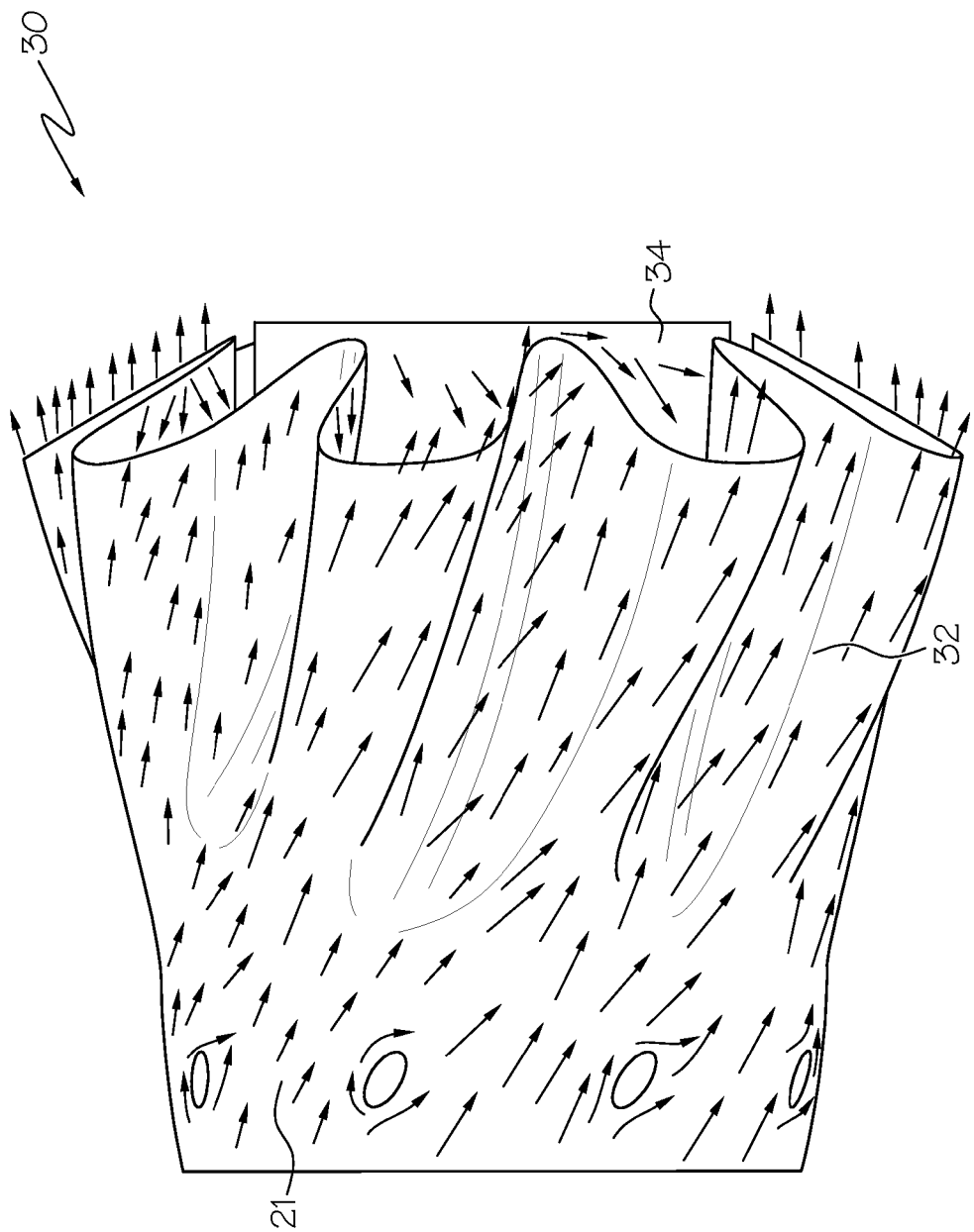
FIG. 5 is a side view of an exhaust gas mixing assembly showing the flow of exhaust air according to the present invention.
Figure 6:
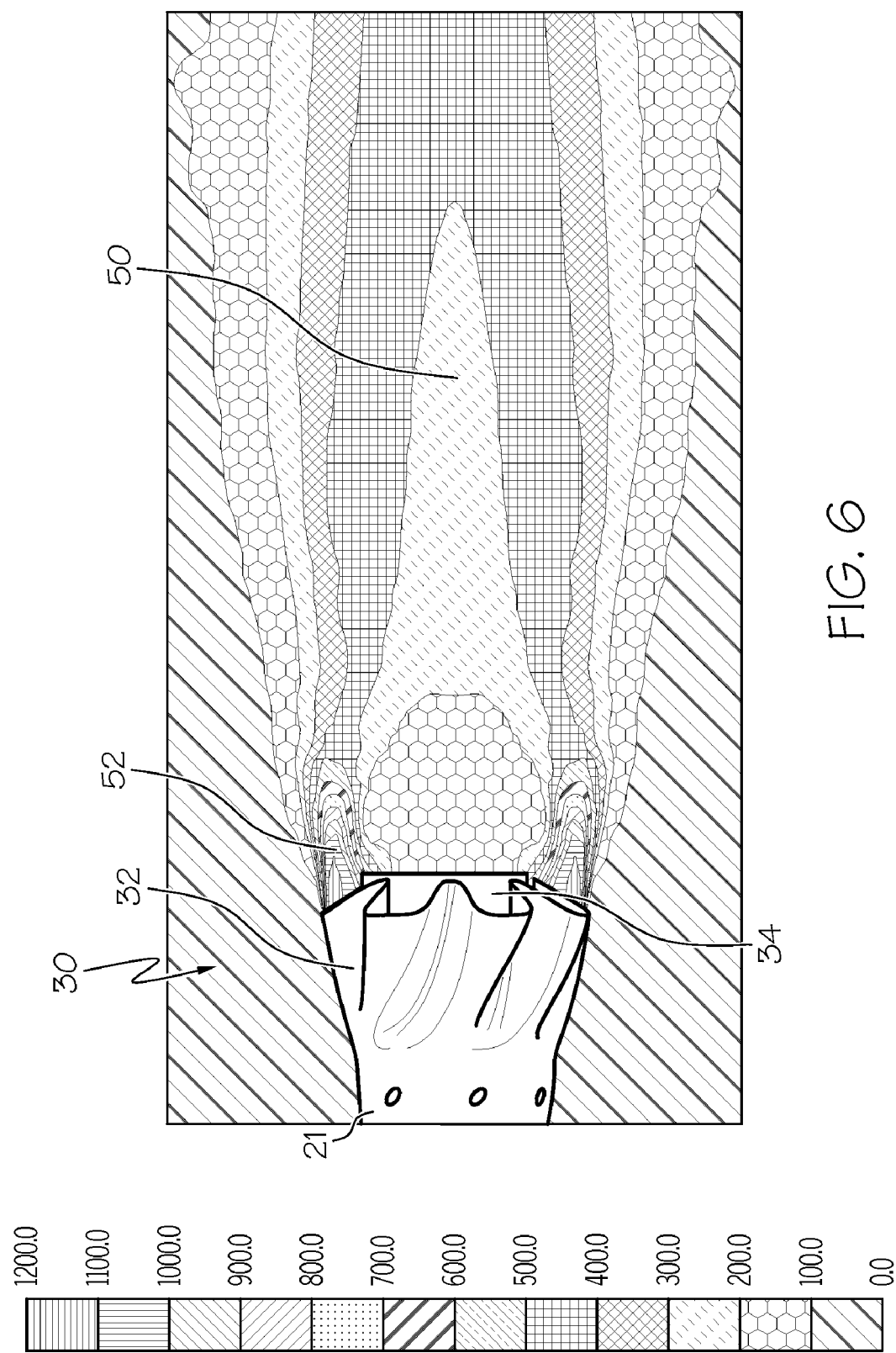
FIG. 6 illustrates the calculated temperature of the exhaust air as it exits the exhaust gas mixing assembly of the present invention.
Figure 7:
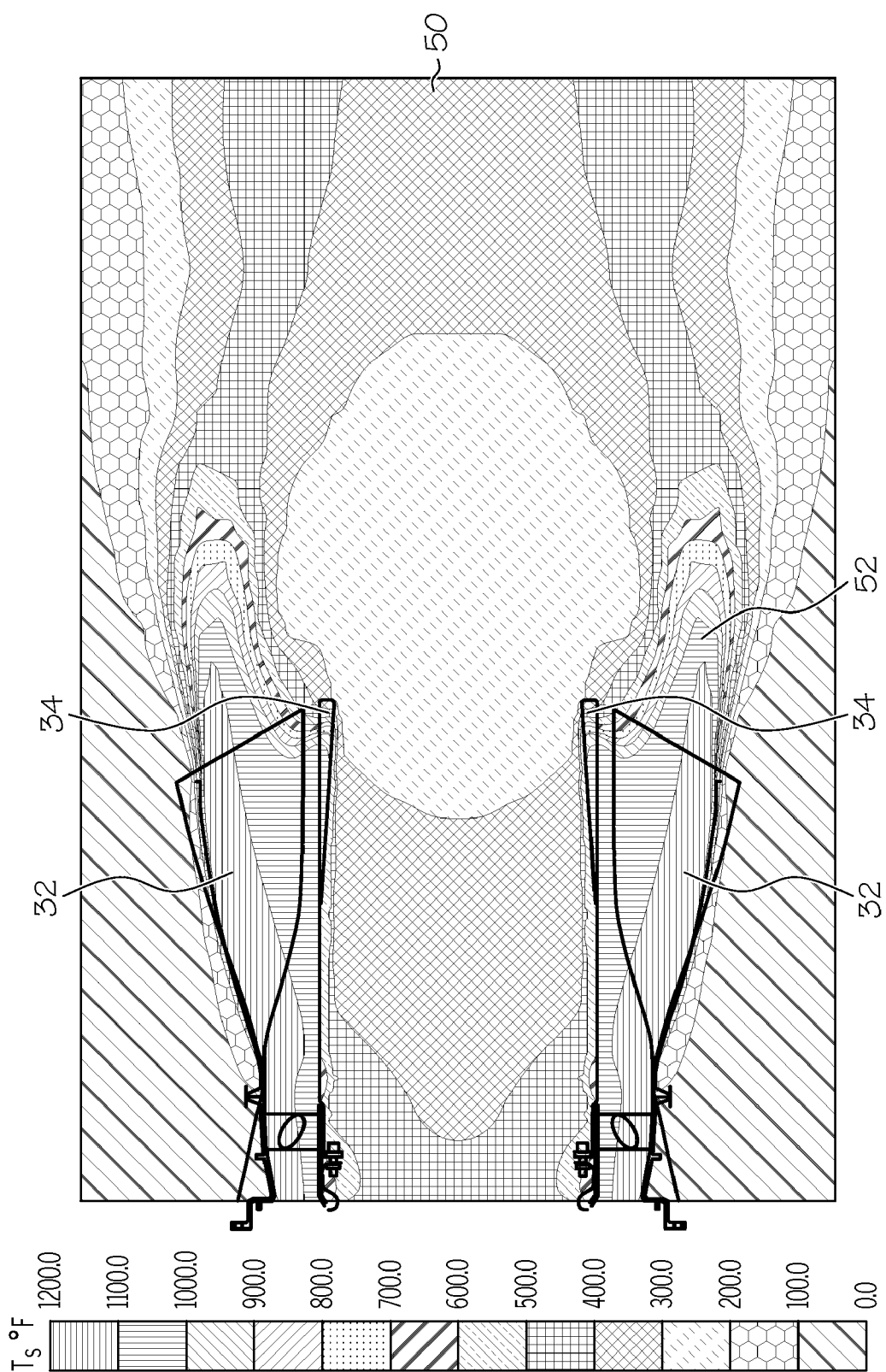
FIG. 7 illustrates the calculated temperature of an exhaust gas mixing assembly according to the present invention.

By way of illustration, FIG. 5 illustrates a CFD solution for a particular engine showing the computed air flow through exhaust mixer assembly 30. FIGS. 6 and 7 then illustrate the cooling of exhaust air using the same parameters as for FIG. 5. As shown in FIG. 6, exhaust mixer assembly 30 of the present invention may efficiently and quickly mix exhaust air with bypass and ambient air as indicated by the cooler plume 50 of exhaust seen away from exhaust mixer assembly 30. The exhaust air in cooler plume 50 may be about 300° F. to about 500° F. as compared to exhaust air at upstream end 38 of exhaust mixer assembly 30, shown as 52, which may be approximately 1000° F. to about 1200° F. Therefore exhaust mixer assembly 30 of the present invention may reduce the temperature of exhaust air by at least 500° F. Moreover, as illustrated in FIG. 7, open centerbody 34 may significantly cool aft frame 21 and rear bearing support 20. The temperature within opening 43 may be from about 300° F. to about 500° F. By way of comparison, if open centerbody 34 were replaced with the solid bulleted centerbody of the prior art, the temperature of the centerbody would be from about 1000° F. to about 1200° F. approximately the same temperature as the exhaust air before cooling.

Figure 9:
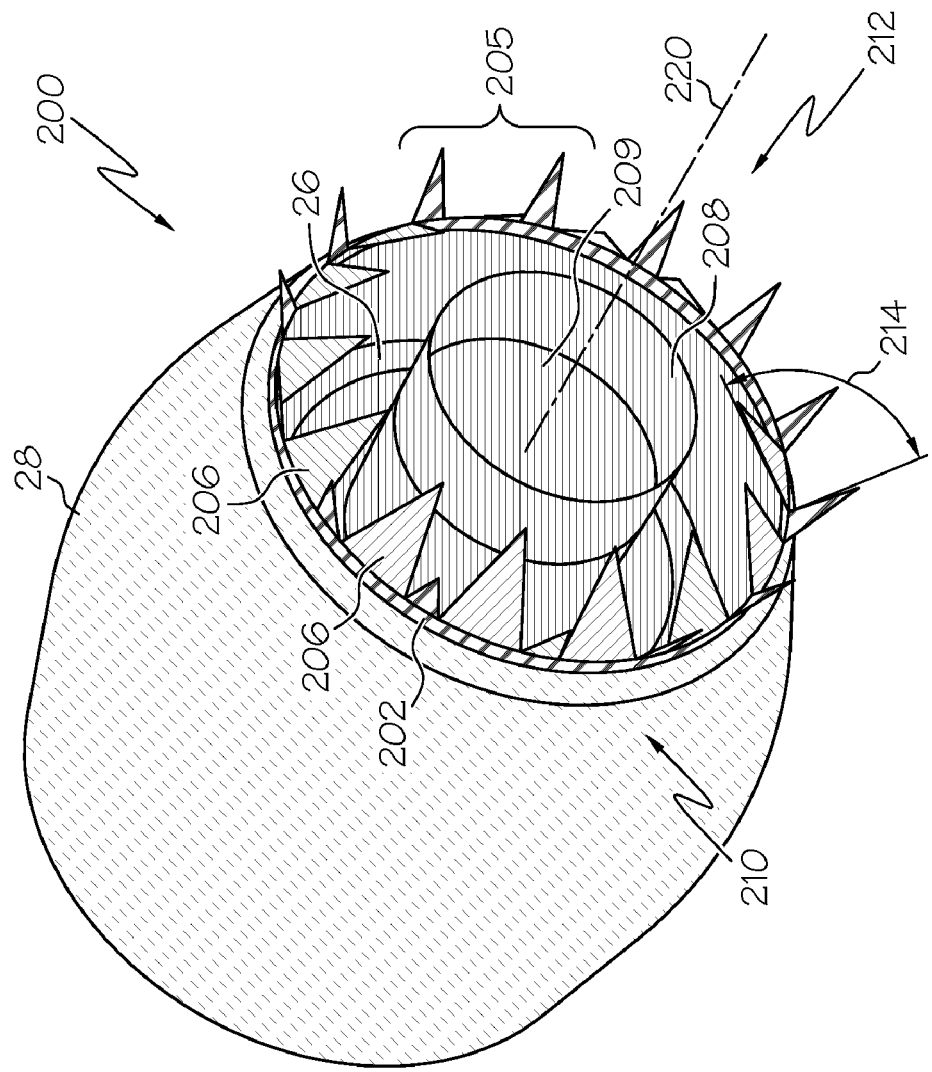
FIG. 9 is a downstream view of a compact serrated exhaust gas mixing assembly according to the present invention.
Figure 10:
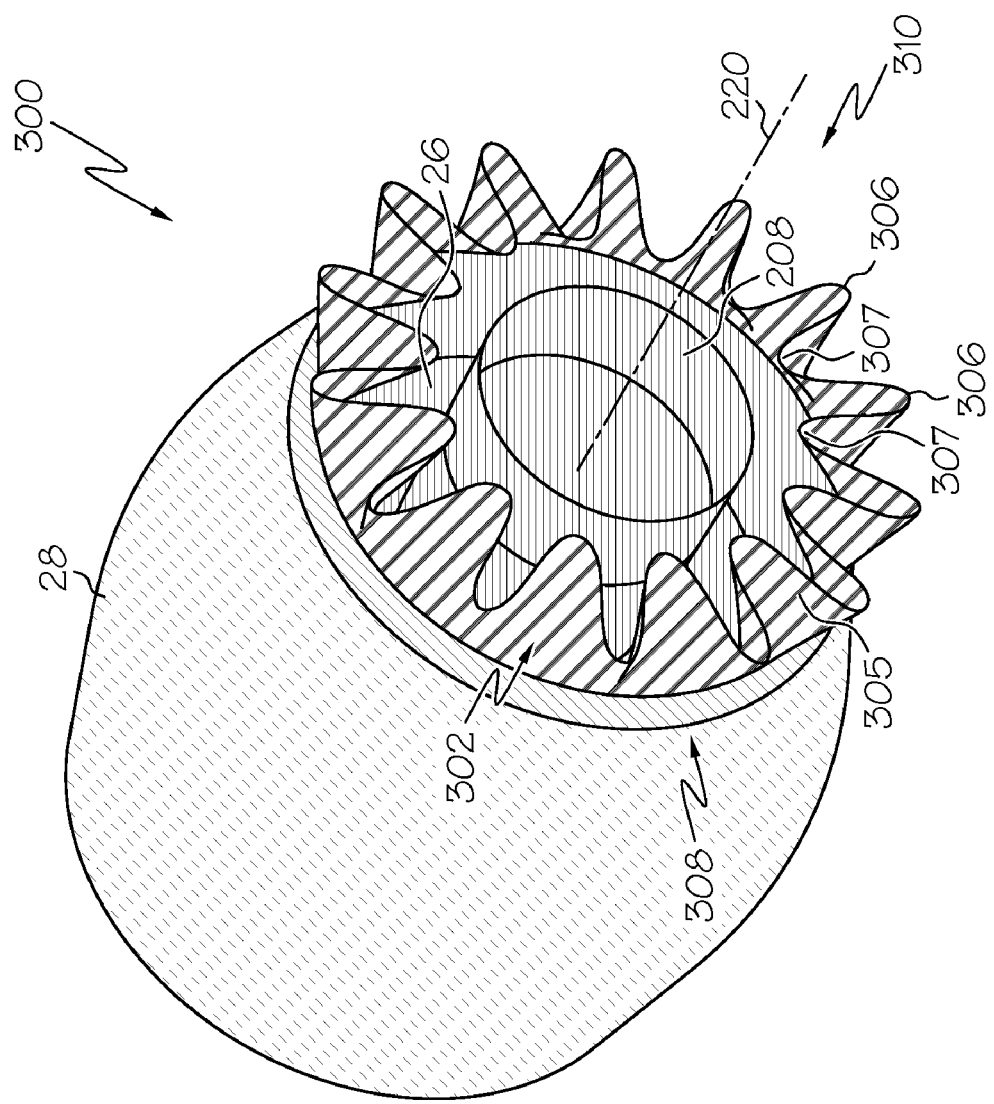
FIG. 10 is a downstream view of a compact lobed gas mixing assembly according to the present invention.

The present invention also provides compact exhaust mixer assemblies. Referring to FIGS. 9 and 10, there is shown two examples of compact exhaust mixer assemblies, a compact serrated mixer assembly 200 (FIG. 9) and a compact lobed mixer assembly 300 (FIG. 10). Compact exhaust mixer assemblies may have similar connect flange diameters as exhaust mixer assembly 30 to allow attachment to turbine engine 10, but are "compact" in that they may be about half the length of non-compact mixer assemblies such as exhaust mixer assembly 30.

Compact serrated mixer assembly 200 may comprise a compact serrated mixer 202 and a compact open centerbody 208 wherein compact open centerbody 208 may be centrally disposed within compact serrated mixer 202 as shown in FIG. 9. Compact serrated mixer assembly 200 may comprise an upstream end 210 and a downstream end 212, where the bypass air and exhaust air may enter compact serrated mixer assembly 200 at upstream end 210 and then may be expelled from compact serrated mixer assembly 200 at downstream end 212.

Figure 11A:
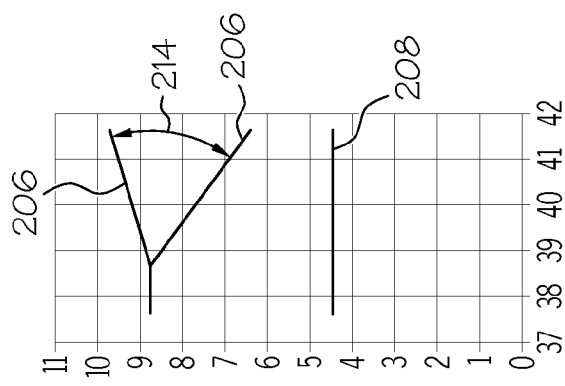
FIG. 11A is a cross-sectional view of a compact serrated mixer assembly according to the present invention.
Figure 11B:
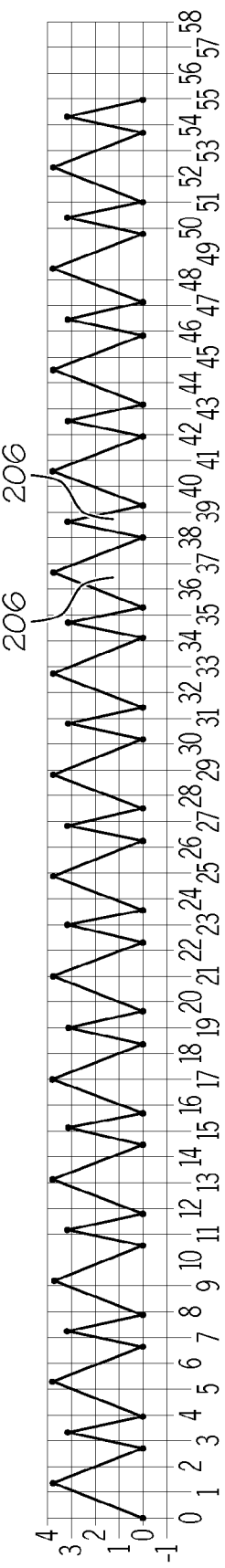
FIG. 11B Two-dimensional flat plate cutout view of the teeth of the compact serrated mixer assembly according to the present invention.

Compact serrated mixer 202 may be attached to the engine aft frame at upstream end 210 and may comprise a serrated edge 205 at downstream end 212. Serrated edge 205 may comprise a plurality of teeth 206, where the teeth 206 may be bent at various angles with respect to a centerline axis 220. The teeth 206 may all have the same surface area or they may have a different surface area. In a non-limiting example, the serrated edge 205 shown in linear fashion in FIG. 11B may have alternating teeth 206 of different surface areas or sizes, with one set of teeth 206 having from about 20% to about 80% the surface area of the other set of teeth 206. The teeth 206 may be bent at various angles with respect to centerline axis 220 where a first set of teeth 206 may be angled toward compact open centerbody 208 and a second set of teeth 206 away from compact open centerbody 208. Compact serrated mixer 202 as shown in FIG. 9 may have every other tooth 206 either angled toward compact open centerbody 208 or away from compact open centerbody 208, where those teeth 206 angled away from compact open centerbody 208 may all be at a same first angle and those teeth 206 angled toward compact open centerbody 208 may all be at a second angle. A cross-section of compact serrated mixer 202 showing the difference angle of the teeth 206 is shown in FIG. 11A. The smaller teeth 206a (see FIG. 11B) may be angled away from compact open centerbody 208 while the larger teeth 206b may be angled toward compact, open centerbody 208. A difference in the angle 214 between the teeth 206 bent towards or away from compact open centerbody 208 may be from about 10° to about 120°. In one illustrative example, difference angle 214 is 56°. It will be appreciated that compact serrated mixer 202 of FIG. 9 is for illustrative purposes only and that the teeth 206 may all be at varying angles with respect to centerline axis 220. The optimal arrangement of teeth 206 in serrated edge 205 may be determined by CFD.

Compact exhaust mixer assembly may alternatively be a compact lobed mixer assembly 300 as shown in FIG. 10. In a manner similar to compact serrated mixer assembly 200, compact lobed mixer assembly 300 may comprise a compact lobed mixer 302 and a compact open centerbody 208, wherein compact open centerbody 208 may be centrally disposed within compact lobed mixer 302 as shown in FIG. 10. Compact lobed mixer assembly 300 may comprise an upstream end 308 and a downstream end 310, where the bypass air and exhaust air may enter compact lobed mixer assembly 300 at upstream end 308 and then may be expelled from compact serrated mixer assembly 300 at downstream end 310.

Compact lobed mixer 302 may be attached to the engine aft frame at upstream end 308 and may comprise a plurality of lobes 306 and troughs 307 defined between the lobes 306 at downstream end 310. The lobes 306 and troughs 307 may be parallel to centerline axis 220 or they may be twisted around centerline axis 220 in a manner similar to that of twisted mixer 32 disclosed above. The degree of twist may vary depending upon the amount of turbine exit swirl as well as the dimensions of the engine itself. The amount of twist may be determined by CFD for the desired engine. In one non-limiting example, the degree of twist may be not greater than about 60° with respect to a leading edge 305 of lobe 306. The lobes 306 may be twisted clockwise or counterclockwise.

The compact exhaust mixer assembly of the present invention may also comprise compact open centerbody 208 as shown with both compact serrated mixer assembly 200 (FIG. 9) and compact lobed mixer assembly (FIG. 10). Compact open centerbody 208 may be disposed within compact serrated mixer 202 or compact lobed mixer 302. Although for simplicity of the discussion, only compact serrated mixer 202 will be referred to hereafter with respect to compact open centerbody 208, it is intended that any embodiment also apply to compact lobed mixer 302 as well. Compact open centerbody 208 may be centrally disposed within compact serrated mixer 202 It will be appreciated that compact open centerbody 208 may be disposed within compact serrated mixer 202 where it is not centrally aligned while still allowing for efficient mixing of exhaust air and bypass air. Compact open centerbody 208 may also be aerodynamic in design. As a non-limiting example, compact open centerbody 208 may have a cylindrical shape with smooth sides and a central opening 209. A cylindrical compact open centerbody 208 may have the same diameter along the entire length, or it may have a smaller diameter downstream and a larger diameter upstream. Conversely, compact open centerbody 208 may have a larger diameter downstream and a smaller diameter upstream.

Compact open centerbody 208 may also be trimmable, allowing for the adjustment of compact open centerbody 208 after manufacturing and during production testing. Trimmable compact open centerbody 208 refers to a compact open centerbody 208 that may be trimmed back after it has been manufactured if required to adjust engine performance. Trimming back compact open centerbody 208 may provide the required core effective area for proper matching between the engine exhaust stream and the bypass stream, as determined from engine test data, to compensate for variations in either compact serrated 200 or lobed 300 mixer assemblies associated with manufacturing processes. Trimmable compact open centerbody 208 may be used to compensate for production tolerances making it possible to obtain the desired core effective area for proper engine operation.

It will be appreciated that the actual dimensions of compact serrated 200 or lobed 300 mixer assemblies may be determined based on the desired cooling or thrust required for a desired application. The shape and size of compact serrated 200 or lobed 300 mixer assemblies may be determined empirically using computational fluid dynamics (CFD) codes. CFD codes are well known in the art and can either be commercially obtained or written by the skilled artisan to determine the dimensions for compact serrated mixer 202 or compact lobed mixer 302 and compact open centerbody 208. Non-limiting examples of commercial CFD codes that may be used with the present invention are FLUENT™, CFX, or STAR-CD. Using the CFD codes the skilled artisan may determine the dimensions required to give optimal cooling and thrust in the desired application.

Figure 12B:
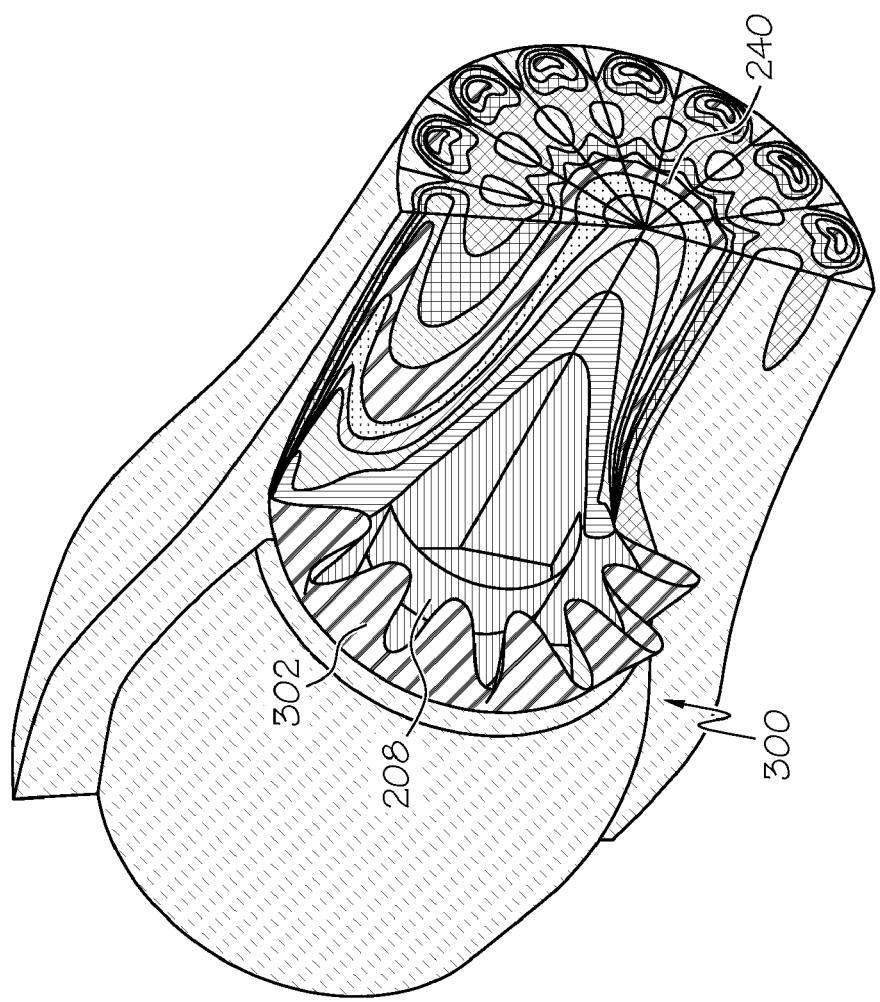
FIG. 12B illustrates the calculated temperature of the exhaust air as it exits the compact lobed exhaust gas mixing assembly according to the present invention.

In way of illustration, FIGS. 12A-C illustrate a CFD solution for a particular engine showing the cooling of exhaust air using specific parameters for compact serrated mixer assembly 200 (FIG. 12A) compact lobed mixer assembly 300 (FIG. 12B) or a compact simple mixer assembly 400 (FIG. 12C), where compact simple mixer assembly 400 has a smooth portion 402 in place of the serrated edge 205 or lobes 306 of compact serrated 200 or lobed 300 mixer assemblies, respectively. As shown in FIGS. 12A and 12B, compact serrated 200 or lobed 300 mixer assemblies may efficiently and quickly mix exhaust air with bypass and ambient air as indicated by a cooler plume 240 of exhaust seen away from compact serrated 200 or lobed 300 mixer assemblies as compared to compact simple mixer assembly 400 (FIG. 12C).

Exhaust mixing assembly 30 as well as compact serrated 200 and lobed 300 mixer assemblies may be constructed using materials known in the art such as, but not limited to, INCO 625. Exhaust mixing assembly 30 may be made of materials that allow it to be as light in weight as possible while being able to function reliably.

Figure 8:
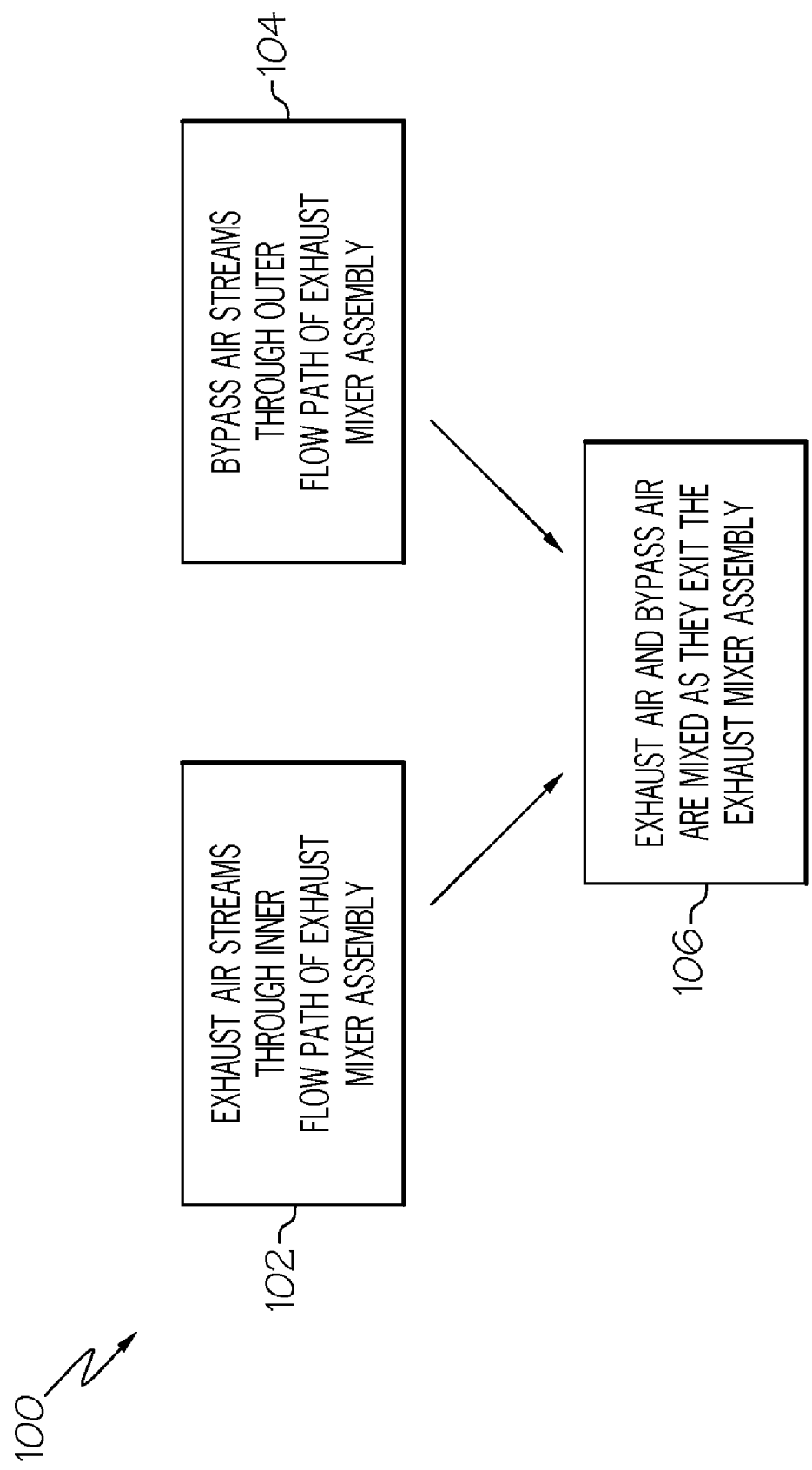
FIG. 8 is a schematic showing a method of cooling exhaust air of a gas turbine engine according to the present invention.

A method for cooling exhaust air in a gas turbine engine is also provided. As illustrated in FIG. 8, method 100 may comprise step 102 where exhaust air may be streamed through an inner flow path of an exhaust mixer assembly, where the inner flow path may be defined between a twisted mixer and an open centerbody of the exhaust mixer assembly, the twisted mixer comprising a plurality of lobes and a plurality of troughs defined between the lobes, wherein the lobes and troughs are twisted about a centerline axis of the twisted mixer and wherein the open centerbody is centrally disposed within the twisted mixer. Alternatively, step 102 may comprise the streaming of exhaust air through an inner flow path of a compact exhaust mixing assembly, where the inner flow path may be defined between a compact serrated or lobed mixer and a compact open centerbody of the compact exhaust mixing assembly. Method 100 may further comprise step 104 in which bypass air may be streamed through an outer flow path of the exhaust mixer assembly, where the outer flow path may be defined between the twisted mixer and an outer engine casing and step 106 in which the exhaust air and bypass air may be mixed as they exit the exhaust mixer assembly. As illustrated in FIGS. 6 and 7, method 100 may efficiently and rapidly mix exhaust air and bypass air to decrease the temperature of exhaust air exiting a gas turbine engine.

It should be understood, of course, that the foregoing relates to exemplary embodiments of the invention and that modifications may be made without departing from the spirit and scope of the invention as set forth in the following claims.

We claim:

1. A compact exhaust mixer assembly for mixing exhaust air with bypass air produced by a gas turbine engine, the compact exhaust mixer assembly comprising:
   an outer engine casing;
   an open centerbody disposed within the outer engine casing;
   a serrated mixer disposed around the open centerbody, the serrated mixer having a serrated edge disposed proximate the downstream end of the open centerbody;
   an outer flow path generally defined by the outer engine casing and the serrated mixer; and
   an inner flow path generally defined by the serrated mixer and the open centerbody;
   wherein the outer flow path and the inner flow path conduct the bypass air and the exhaust air, respectively, produced by the gas turbine engine during operation, and wherein the serrated edge is configured to promote the mixing of the bypass air and the exhaust air.

2. The compact exhaust mixer assembly of claim 1 wherein the serrated edge comprises:
   a first plurality of teeth angled toward the downstream end of the open centerbody; and
   a second plurality of teeth interspersed with the first plurality of teeth and angled away from the downstream end of the open centerbody, each tooth in the second plurality of teeth having surface area less than that of each tooth in the first plurality of teeth.

3. The compact exhaust mixer assembly of claim 2 wherein each tooth in the second plurality of teeth has a surface area that is approximately 20% to approximately 80% less than the surface area of each tooth in the first plurality of teeth.

4. The compact exhaust mixer assembly of claim 3 wherein there is a difference angle of from about 10° to about 120° between the first plurality of teeth angled toward the downstream end of open centerbody and the second plurality of teeth angled away from the downstream end of open centerbody.

5. The compact exhaust mixer assembly of claim 1 wherein the open centerbody and the mixer are attached to a rear bearing support and aft frame of a turbine engine.

6. A compact exhaust mixer assembly for mixing exhaust air with bypass air produced by a gas turbine engine (GTE), the GTE including an aft frame, the compact exhaust mixer assembly comprising:
   a serrated mixer, the serrated mixer comprising:
      an upstream end configured to be mounted to the aft frame of the GTE;
      a downstream end; and
      a serrated edge formed around the downstream end;
   an open centerbody disposed within the serrated mixer, the open centerbody including an open downstream end generally circumscribed by the serrated edge;
   an outer engine casing disposed around the serrated mixer and the open centerbody;
   an inner flow path generally defined by an inner surface of the serrated mixer and an outer surface of the open centerbody, the inner flow path conducting exhaust air during operation of the GTE; and
   an outer flow path generally defined by an inner surface of the outer engine casing and an outer surface of the serrated mixer, the outer flow path conducting bypass air during operation of the GTE;
   wherein the serrated edge is configured to mix exhaust air from inner flow path with bypass air from the outer flow path to cool the exhaust air exhausted by the GTE.

7. The compact exhaust mixer of claim 6 wherein the serrated edge comprises a plurality of teeth, and wherein a first set of teeth are disposed toward the open centerbody and a second set of teeth are disposed away from the open centerbody.

8. The compact exhaust mixer assembly of claim 7 wherein every other tooth is disposed toward the open centerbody.

9. The compact exhaust mixer assembly of claim 7 wherein there is a difference angle of 56° between the first set of teeth disposed toward the open centerbody and the second set of teeth disposed away from the open centerbody.

10. The compact exhaust mixer assembly of claim 7 wherein the teeth disposed away from the open centerbody have a surface area of from about 20% to about 80% of a surface area of the teeth disposed toward the open centerbody.

* * * * *

UNITED STATES PATENT AND TRADEMARK OFFICE
CERTIFICATE OF CORRECTION

| | |
|---|---|
| PATENT NO. | : 7,506,501 B2 |
| APPLICATION NO. | : 11/223556 |
| DATED | : March 24, 2009 |
| INVENTOR(S) | : Morris G. Anderson |

It is certified that error appears in the above-identified patent and that said Letters Patent is hereby corrected as shown below:

Column 1, Line 4, insert the following:

--GOVERNMENT RIGHTS

This invention was made with Government support under DAAH10-03-2-0007 awarded by the U.S. Army. The Government has certain rights in this invention.--

Signed and Sealed this

Twenty-third Day of June, 2009

JOHN DOLL
*Acting Director of the United States Patent and Trademark Office*